(12) United States Patent
Luna et al.

(10) Patent No.: US 7,409,236 B1
(45) Date of Patent: Aug. 5, 2008

(54) PORTABLE COMMUNICATION DEVICE WITH EXTENDABLE VISUAL DISPLAY

(75) Inventors: Bernardo Luna, San Diego, CA (US); John Philip Taylor, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 456 days.

(21) Appl. No.: 11/212,834

(22) Filed: Aug. 25, 2005

(51) Int. Cl.
*H04M 1/00* (2006.01)
*H04B 1/38* (2006.01)

(52) U.S. Cl. .................. 455/575.1; 455/566; 455/575.4; 455/90.3

(58) Field of Classification Search .................. 455/566, 455/90.3, 575.1, 575.3, 575.4, 347–349
See application file for complete search history.

(56) References Cited

U.S. PATENT DOCUMENTS

| | | | |
|---|---|---|---|
| D298,243 S | 10/1988 | Watanabe | |
| 5,338,896 A | 8/1994 | Danforth | |
| 6,243,595 B1 | 6/2001 | Lee et al. | |
| 6,519,483 B1* | 2/2003 | Watanabe | 455/575.1 |
| 6,542,721 B2 | 4/2003 | Boesen | |
| 6,615,058 B2 | 9/2003 | Nagai | |
| 6,707,764 B2 | 3/2004 | Davidson et al. | |
| 6,748,242 B1 | 6/2004 | Dunleavy | |
| 6,748,249 B1* | 6/2004 | Eromaki et al. | 455/575.4 |
| 6,801,796 B2 | 10/2004 | Finke-Anlauff | |
| 2002/0090980 A1* | 7/2002 | Wilcox et al. | 455/566 |
| 2004/0229662 A1* | 11/2004 | Chadha | 455/575.1 |
| 2005/0130720 A1* | 6/2005 | Finke-Anlauff | 455/575.3 |
| 2005/0233785 A1* | 10/2005 | Park et al. | 455/575.4 |

* cited by examiner

*Primary Examiner*—Simon D Nguyen

(57) ABSTRACT

A retractable visual display is movable along a longitudinal axis of the visual display from a retracted position within the device housing of the portable communication device to an extended position where at least a portion of the visual display is exposed outside of the device housing in the extended position. The visual display is off when retracted and power is supplied to the visual display only in the extended position although the communication functions are active when the visual display is retracted within the device housing. In some circumstances, a secondary display presents limited information when the visual display is retracted.

20 Claims, 6 Drawing Sheets

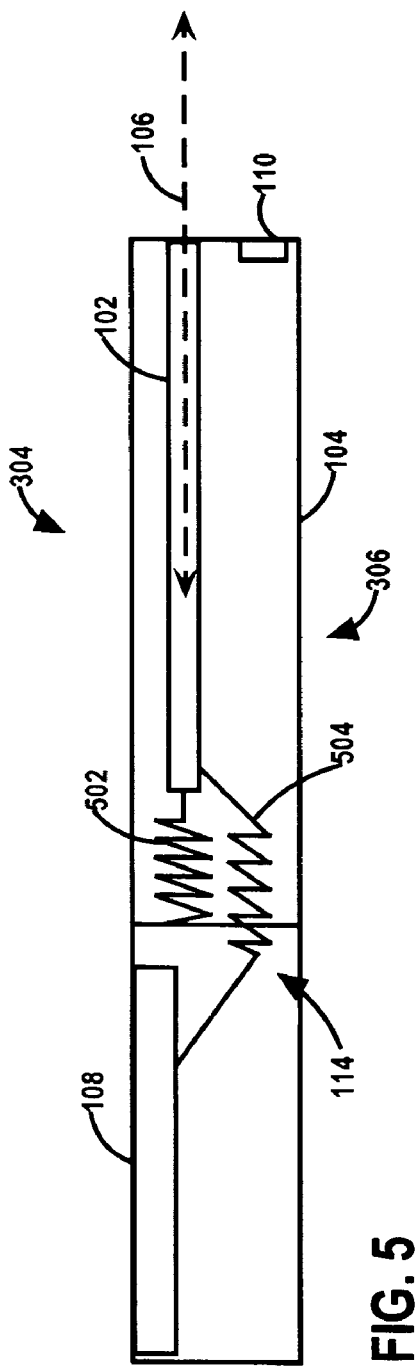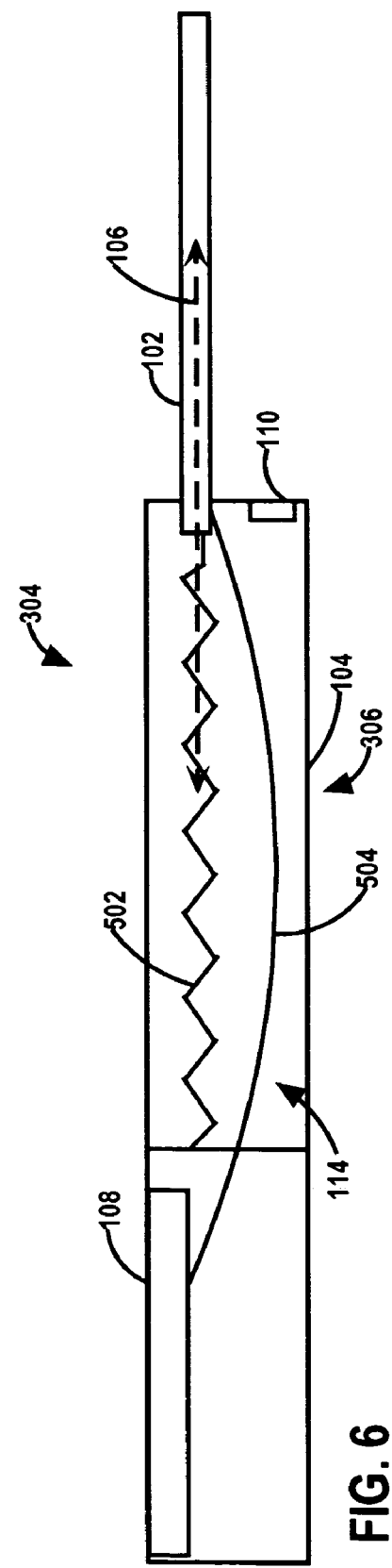

PORTABLE COMMUNICATION DEVICE WITH EXTENDABLE VISUAL DISPLAY

FIELD OF THE INVENTION

The invention relates in general to portable communication devices and more specifically to a portable communication device with an extendable visual display.

BACKGROUND OF THE INVENTION

Many portable communication devices such as cellular telephones and wireless personal digital assistants (PDAs) include visual displays for presenting information to the user. Many conventional devices include a liquid crystal display (LCD) that is attached to a main device housing or to a hinged cover (flip display). Typically the visual displays are implemented using large color displays in order to facilitate user tasks such as web browsing, viewing contact, file, and song lists, and playing games. Conventional devices, however, are limited in that the visual display must be exposed to perform tasks that do not require the large color display. As a result, the form factor of the conventional devices is larger than necessary during these tasks. For example, where the display is implemented as part of the rotating flip, the flip must be opened to answer an incoming call even when the user does not require the display. In devices where the display is attached to the main housing, the device has a form factor that must provide adequate area for the display, the keypad, and other user interface devices. In addition to the larger than necessary form factor, conventional devices unnecessarily consume power since current is supplied to the large color display when such a display is not needed.

Accordingly, there is a need for a portable communication device with an extendable visual display.

BRIEF DESCRIPTION OF THE DRAWINGS

FIG. 5 is a block diagram of a side view of the portable communication device in accordance with the exemplary embodiment when the visual display is retracted.

FIG. 6 is a block diagram of a side view of the portable communication device in accordance with the exemplary embodiment when the visual display is extended.

DETAILED DESCRIPTION OF THE PREFERRED EMBODIMENTS

In accordance with an exemplary embodiment of the invention, a retractable visual display is movable along a longitudinal axis of the visual display from a retracted position within the device housing of the portable communication device to an extended position where at least a portion of the visual display is exposed outside of the device housing in the extended position. The visual display is inactive when retracted and power is supplied to the visual display only in the extended position although the communication functions are active when the visual display is retracted within the device housing. In the exemplary embodiment, a secondary display presents limited information when the visual display is retracted.

Figure 1:
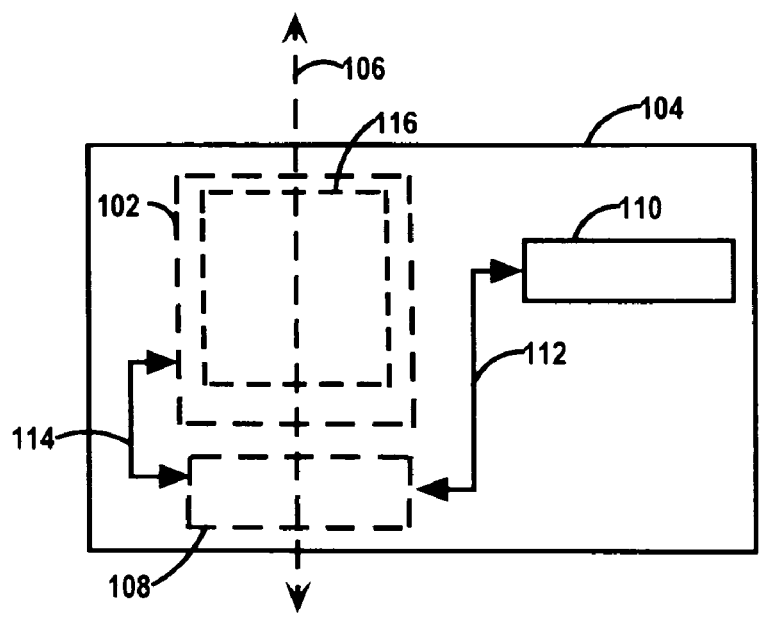
FIG. 1 is a block diagram of a portable communication device in accordance with the exemplary embodiment of the invention with the visual display in the non-extended position.
Figure 2:
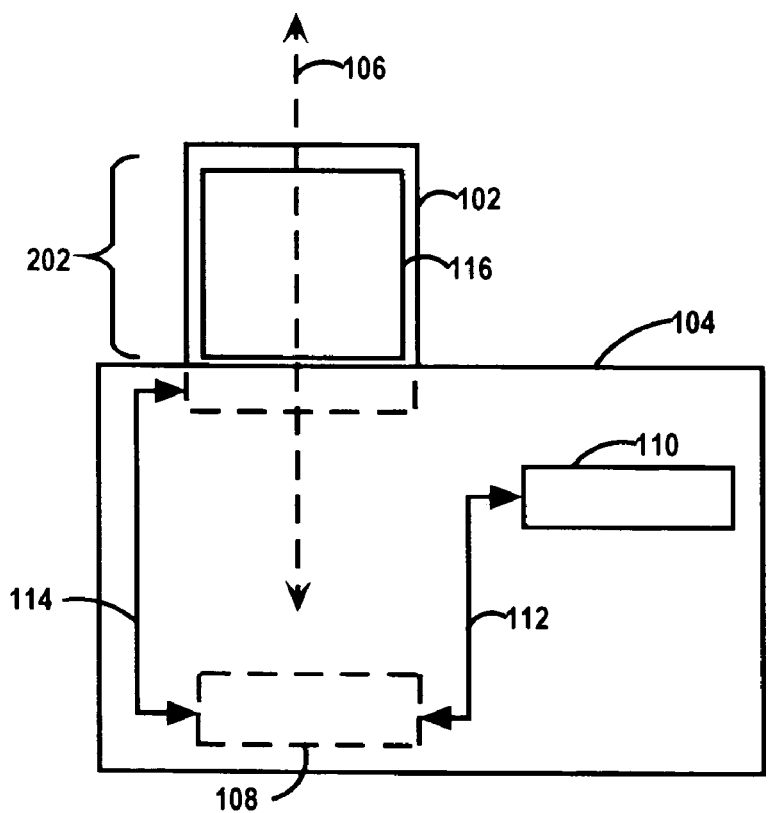
FIG. 2 is a block diagram of the portable communication device in accordance with the exemplary embodiment of the invention with the visual display in the extended position.

FIG. 1 and FIG. 2 are block diagrams of front views of a retractable visual display 102 within a device housing 104 in accordance with the exemplary embodiment of the invention. The blocks in FIG. 1 and FIG. 2 generally represent exemplary relative configurations of the retractable visual display 102 in a retracted position and extended position, respectively, and do not necessarily represent relative sizes or positions of the components illustrated. In the exemplary embodiments, the visual display 102 is implemented as part of a portable communication device such as, for example, a cellular telephone or wireless PDA. The device housing 104 in the exemplary embodiment, therefore, is the device housing 104 of the portable communication device. The visual display 102 is movable along a longitudinal axis 106 relative to the mobile communication device housing 104 and can be retracted or extended relative to the device housing 104. At least a portion 202 of the visual display is exposed outside of the device housing 104 when the visual display 102 is in the extended position. In the exemplary embodiment, a viewable screen 116 of the visual display 102 is entirely exposed outside of the device housing 104 when the visual display 102 in the extended position and completely enclosed within the device housing 104 in the retracted position.

As discussed in further detail below with reference to the exemplary extension mechanism, a user extends the visual display 102 by activating a release mechanism that allows a spring to slideably move the visual display relative to the device housing 104 along the longitudinal axis 106. The user retracts the visual display 102 by pushing the visual display back into the device housing 104 to compress the spring until the release mechanism secures the visual display 102 in the retracted position. As discussed below, other release and extension mechanisms can be used. In some situations, for example, where a spring is not used, the user extends and retracts the extendable visual display 102 by grasping and moving the visual display 102 relative to the device housing 104. The visual display 102 slideably moves along an attachment mechanism that provides sufficient friction to maintain the visual display 102 in a relative position to the device housing 104. Locking mechanisms may be used to secure the visual display 102 in the retracted position and/or extended position.

A connection interface 114 connects device circuitry 108 to the visual display 102. The connection interface 114 provides an electrical connection between the display 102 and the device circuitry 108 at least when the visual display 102 is in an extended position. Power is supplied to the visual display 102 at least when the visual display 102 is extended. In the exemplary embodiment, the connection interface 114 includes a flex circuit cable configured to convey electrical control signals and power to the visual display 102. Although a continuous connection is maintained between the device circuitry 108 and the visual display 102 in the exemplary embodiment, the visual display 102 is only active in the extended position. Accordingly, control signals and power are only provided to the visual display 102 in the extended position in the exemplary embodiment. In some circumstances, the connection interface 114 is only connected to the device circuitry 108 in the extended position. For example, connections between the visual display 102 and the device circuitry 108 can be formed through a series of electrical contacts on the visual display 102 that contact electrical contacts on the device housing 104 when the visual display 102 is in the extended position. Although any of numerous LCDs, thin-film transistor (TFT) LCDs or other devices may be used, the visual display 102 is a TFT in the exemplary embodiment.

In the exemplary embodiment, the device housing 104 includes a secondary display 110 that presents information to the user when the visual display 102 is retracted. The secondary display 110 is smaller and consumes less power than the visual display 102. Examples of suitable devices for use as the secondary display 110 include Gray scale and color supertwist nematic (CSTN) displays. Information that is presented through the secondary display 110 is limited to single color graphics, symbols, and alphanumeric characters in the exemplary embodiment. Accordingly, a relatively low power, low cost device may be used as the secondary display 110. Examples of information that can be presented through the secondary display 110 include caller identification (ID) telephone numbers, names, signal power, voice mail alerts, message alerts, incoming call alerts, date, time, call duration, battery status, and call status. In the exemplary embodiment, the portable communication device performs a variety of functions when the visual display 102 is retracted to allow the user to use the device without extending the visual display 102. For example, the user may answer or place a call without extending the visual display 102. Further, the user may browse contact lists and access menu items such as ringers and music without the use of the visual display 102. Accordingly, the smaller form factor may be maintained while the user engages in activities that do not require the visual display 102. Power consumption is minimized and battery life is extended. As discussed below with reference to FIG. 7, the secondary display 110 may be implemented as part of the visual display 102 in some circumstances. Although the secondary display 110 is not active when the visual display 102 is extended in the exemplary embodiment, the secondary display 110 may be implemented to present some information when the visual 102 display is extended.

Figure 3:
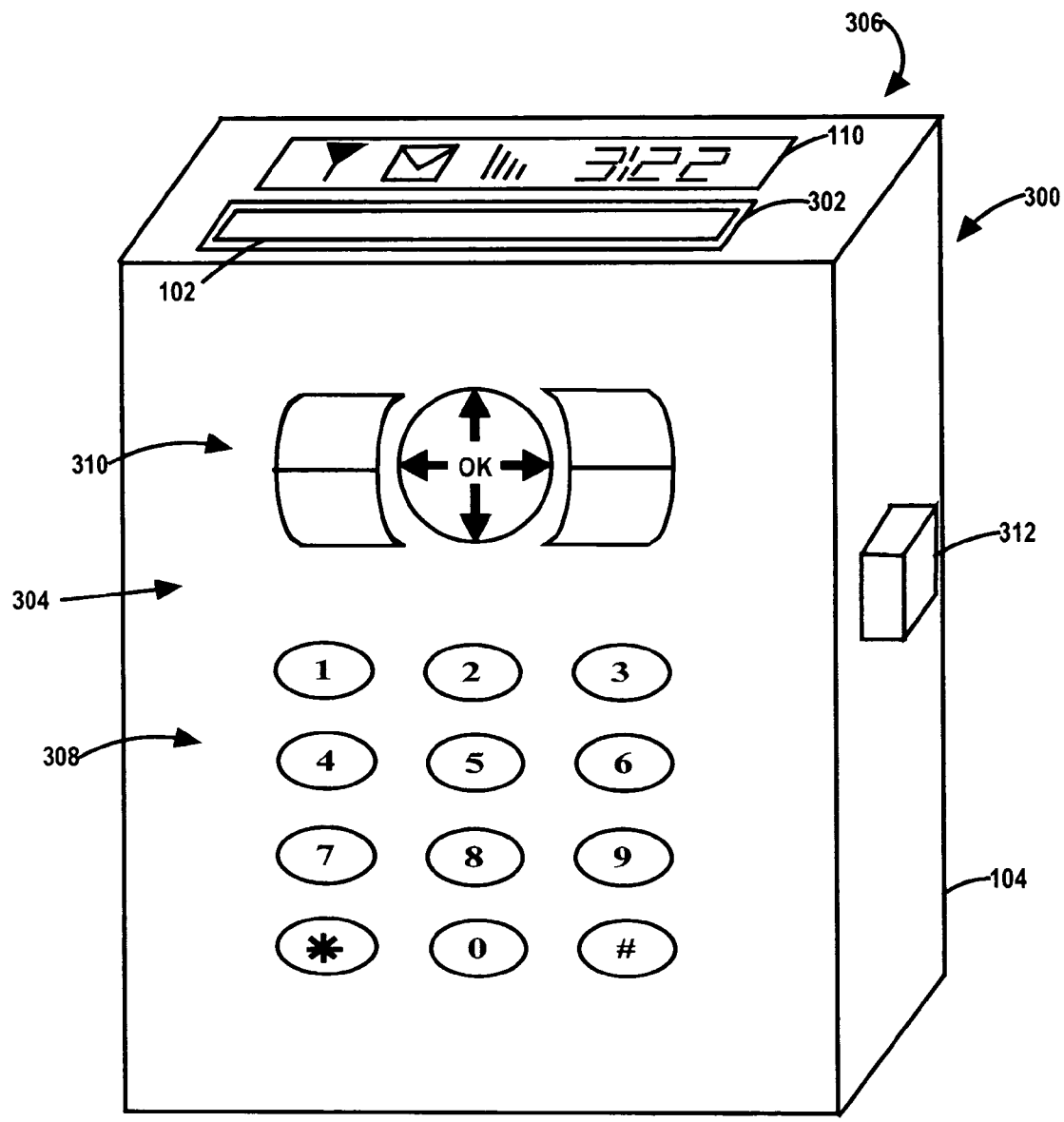
FIG. 3 is a block diagram of a perspective view of the portable communication device in accordance with the exemplary embodiment of the invention with the visual display in the non-extended position.
Figure 4:
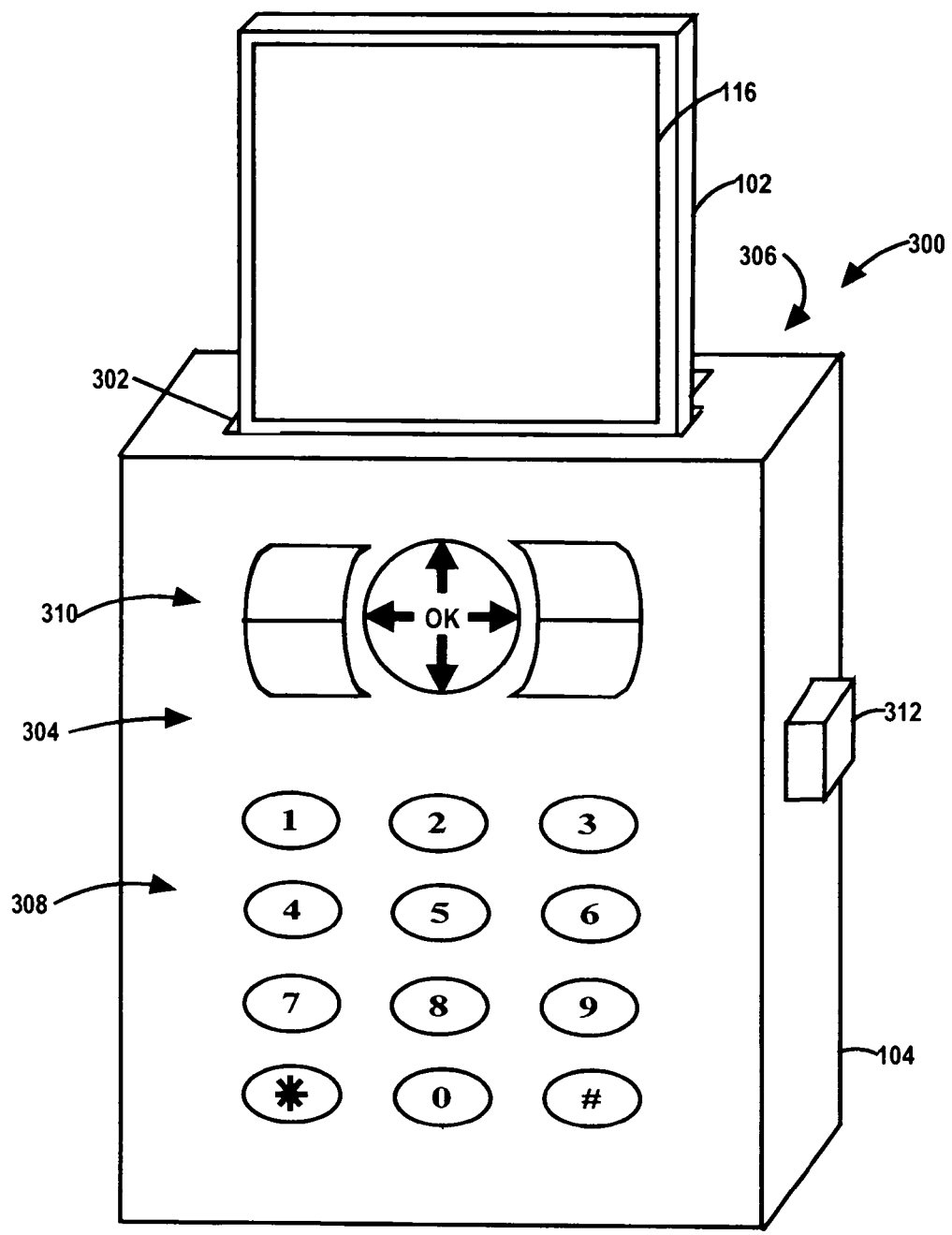
FIG. 4 is a block diagram of a perspective view of the portable communication device in accordance with the exemplary embodiment of the invention with the visual display in the extended position.

FIG. 3 and FIG. 4 are block diagram illustrations of perspective views of the portable communication device 300 in accordance with the exemplary embodiment of the invention. The blocks in FIG. 3 and FIG. 4 generally represent exemplary relative configurations of the retractable visual display 102 in a retracted position and extended position, respectively, and do not necessarily represent relative sizes or positions of the components illustrated.

The visual display 102 extends through an opening 302 within the device housing 104 allowing the visual display 102 to move in an area between a front control face 304 and a back 306. In the exemplary embodiment, the opening 302 is positioned on a top of the visual display 102. When the visual display 102 is extended, the screen 116 is exposed on the outside of the device housing 104 and positioned to face the same direction as the front control face 304. The front control face 304 includes a user interface that allows the user to enter information. In the exemplary embodiment, the front control face 304 includes a key pad 308 and a plurality of navigation controls 310 including a joystick. Any combination of buttons, joysticks, keys and/or controllers may be used to form the user interface.

The exemplary portable device 300 includes a release mechanism 312 that is configured to release the visual display 102 from the retracted position when activated. As described below in further detail, a compression spring is at least partially compressed when the visual display 102 is retracted. The compression spring applies a force to the visual display 102 in the direction that the visual display 102 is extended. A latch (not shown) secures the visual display 102 in the retracted position. When the release mechanism 312, is activated the latch releases the visual display 102 allowing it to move along the longitudinal axis 106 to the extended position.

FIG. 5 and FIG. 6 are block diagram illustrations of sectional side views of the portable communication device 300 in accordance with the exemplary embodiment of the invention where the extension mechanism includes a compression spring 502. The blocks in FIG. 5 and FIG. 6 generally represent exemplary relative configurations of the portable communication device 300 with a retractable visual display 102 in a retracted position and extended position, respectively, and do not necessarily represent relative sizes or positions of the components illustrated.

The compression spring 502 is connected to the device housing 104 or a secure member that is connected to the device housing 104. When the visual display 102 is retracted, the compression spring 502 is at least partially compressed and exerts a force in the direction that the visual display 102 moves relative to the device housing 104 when it is extended. A latch (not shown) or other securing apparatus keeps the visual display 102 from moving until the release mechanism 312 is activated. In the exemplary embodiment, latch releases the visual display 102 when the release mechanism is depressed by the user. The compression spring 502 moves the visual display 102 along the longitudinal axis 106 through the opening 302 to extend the visual display 102 to the extended position. In the exemplary embodiment, the opening 302, device housing 104, and visual display 102 are configured to form a snug fit between the visual display 102 and the device housing 104 in the extend position to minimize lateral movement of the visual display 102 relative to the device housing 104. The compression spring 502 is at least partially extended when the visual display 102 is in the extended position. The visual display 102 is retracted by moving the visual display 102 back into the device housing 104 and compressing the compression spring 502 until the latch secures the visual display 102 in the retracted position.

The connection interface 114 in the exemplary embodiment is a section of flex circuit cable 504 that includes at least conductors for supplying power and control signals to the visual display 102. In some circumstances other conductors may provide other control or power related signals. For example, one or more conductors may provide ground to the visual display 102. The flex circuit cable 504 has a length and configuration that allows the visual display 102 to move freely from the retracted position to the extended position.

Figure 7:
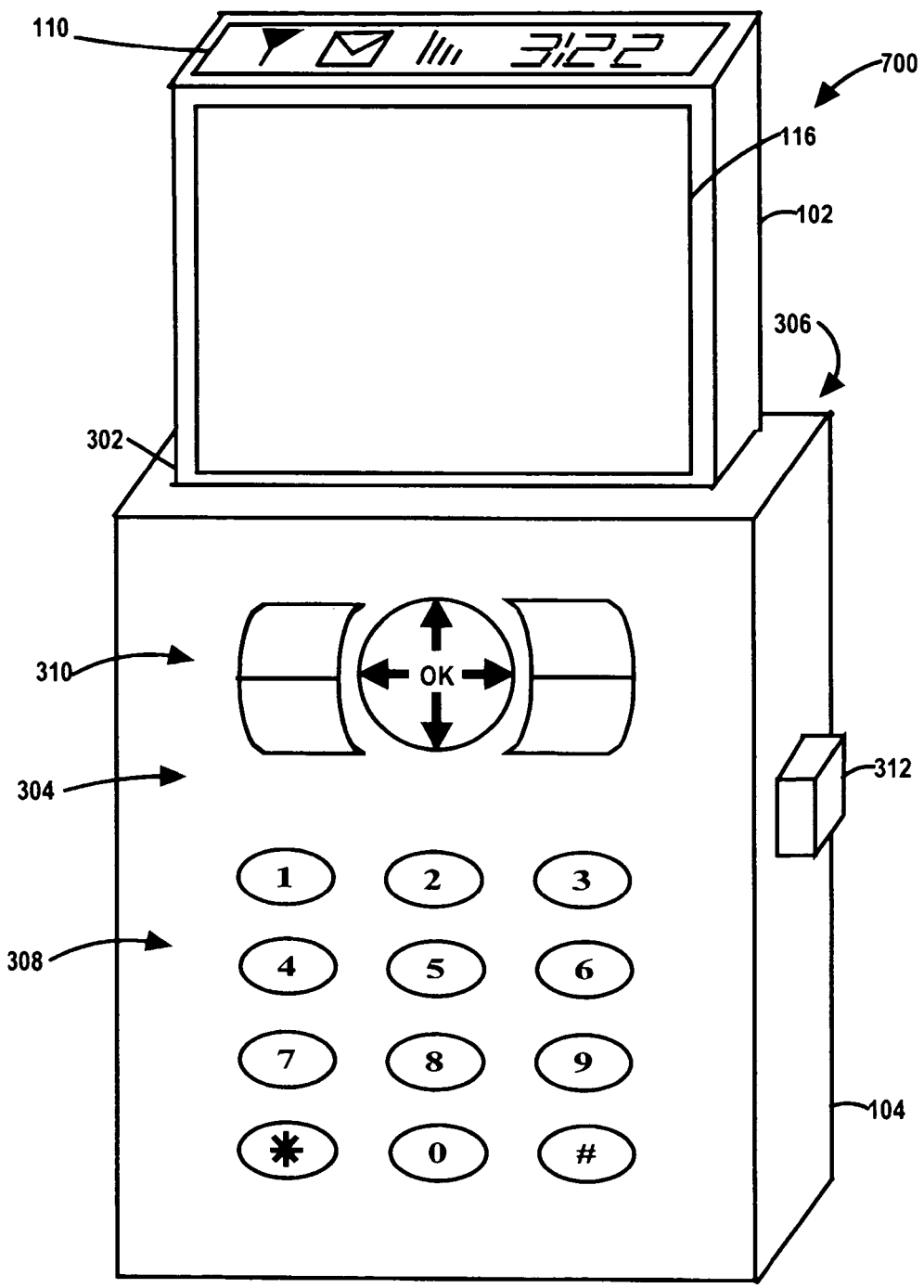
FIG. 7 is a block diagram of a perspective view of an exemplary portable communication device where a secondary display is attached to the visual display.

The visual display 102, secondary display 110, connections interface 114, extension mechanism 502, and release mechanism 312 may be implemented in different ways without departing from the scope of the invention. Further, the various components of the portable communication device 300 may be arranged in any of numerous configurations. For example, the secondary display 110 may be omitted in some circumstances or secured in any of several positions on the device housing 104. FIG. 7 is a block diagram of a perspective view of an exemplary portable communication device 700 where the secondary display 110 is connected to the visual Where the connection interface 114 includes a flex circuit cable display 102. In addition to the signals provided to the visual display 102, the connection interface 114 provides control signals to the secondary display 110 in this arrangement. 504, additional conductors may be required for the secondary display 110. In some circumstances, a connection interface 114 that establishes a connection only with the visual display 102 in extended position and only with the secondary display 110 in the retracted position may be used. Other extension mechanisms include a corkscrews or threaded members configured to extend the visual display 102 when the threaded member is rotated. A bottom portion of the device housing 104 may be configured to rotate relative to the main device housing 104. The threaded member includes threads that engage complementary gear or thread mounted to the display 102 where the pitch of the threads requires a low number of rotations for the display to be fully extended. An example of a suitable configuration includes a thread pitch or gear ratio that results in a extending the visual display 102 from the retracted position to the extended position with a half rotation of the bottom portion of the device housing 104.

Figure 8:
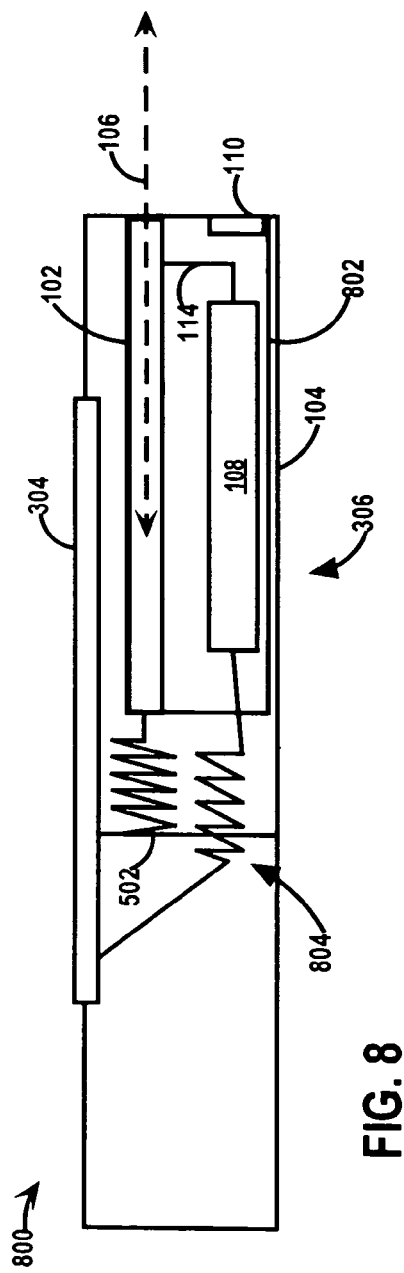
FIG. 8 is a block diagram of a sectional side view of the portable communication device in accordance with a second exemplary embodiment of the invention where the extension mechanism includes a compression spring in a retracted position and the device circuitry is housed within the display housing.
Figure 9:
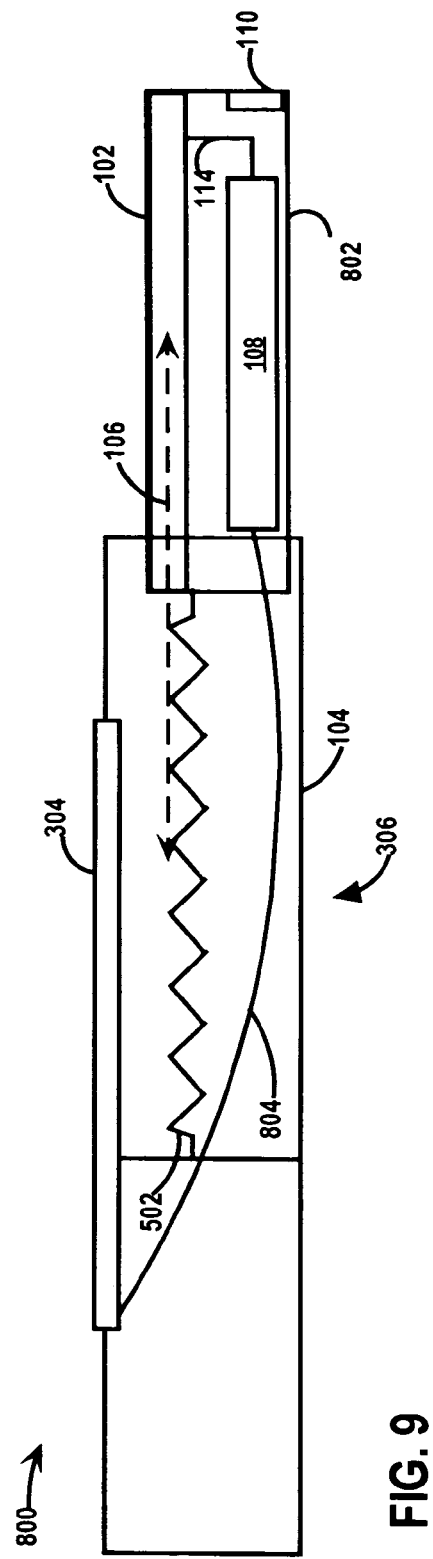
FIG. 9 is a block diagram of a sectional side view of the portable communication device in accordance with a second exemplary embodiment of the invention where the extension mechanism includes a compression spring in an extended position and the device circuitry is housed within the display housing.

FIG. 8 and FIG. 9 are block diagram illustrations of sectional side views of a portable communication device 800 in accordance with a second exemplary embodiment of the invention where the extension mechanism includes a compression spring 502 and the device circuitry 108 is housed within a display housing 802. The blocks in FIG. 8 and FIG. 9 generally represent exemplary relative configurations of the portable communication device 800 with a retractable visual display 102 in a retracted position and extended position, respectively, and do not necessarily represent relative sizes or positions of the components illustrated.

In the second exemplary embodiment, the visual display 102 and the device circuitry 108 are housed within a display housing 802 that extends relative to the device housing 104 and retracts within the device housing 104. The display housing 802 extends along the longitudinal axis 106 between the front control face 304 and the back 306. A front face interface 804 connects the device circuitry 108 to the keys and other user input devices of the front control face 304. The front face interface 804 is configured to maintain an electrical connection between the device circuitry 108 and the front control face 304 at least when the display housing 802 is extended and when the display housing 802 is retracted within the device housing 104. An example of a suitable control face interface 804 is a section of flex circuit cable.

The compression spring 502 is connected to the device housing 104 or a secure member that is connected to the device housing 104. When the display housing 802 is retracted, the compression spring 502 is at least partially compressed and exerts a force in the direction that the display housing 802 and visual display 102 move relative to the device housing 104 when extended. A latch (not shown) or other securing apparatus keeps the display housing 802 from moving until the release mechanism 312 is activated. In the exemplary embodiment, a latch releases the display housing 802 when the release mechanism 312 is depressed by the user. The compression spring 502 moves the display housing 802, device circuitry 108, and visual display 102 along the longitudinal axis 106 through the opening 302 to extend the display housing 802 to the extended position. In the exemplary embodiment, the opening 302, device housing 104, and display housing 802 are configured to form a snug fit between the display housing 802 and the device housing 104 in the extend position to minimize lateral movement of the display housing 802 relative to the device housing 104. The compression spring 502 is at least partially extended when the display housing 802 is in the extended position. The display housing 802 and visual display 102 are retracted by moving the display housing 802 back into the device housing 104 and compressing the compression spring 502 until the latch secures the display housing 802 in the retracted position.

Since the visual display 102 does not move relative to the device circuitry 108 in the second exemplary embodiment, any of numerous connection interfaces may be used without consideration of varying distances between the visual display 102 and the device circuitry 108. The connection interface 114 in the second exemplary embodiment is a section of flex circuit cable 504 that includes at least conductors for supplying power and control signals to the visual display 102. In some circumstances other conductors may provide other control or power related signals. For example, one or more conductors may provide ground to the visual display 102.

The front face interface 804 in the second exemplary embodiment is a section of flex circuit cable that includes at least conductors for supplying power and control signals to the keypad 308, navigation controls 310, and other components of the front control face 304. In some circumstances other conductors may provide other control or power related signals. For example, one or more conductors may provide power to backlighting components, LEDs, or lights. The front face interface 804 has a length and configuration that allows the display housing 802 and device circuitry 108 to move freely from the retracted position to the extended position. In the second exemplary embodiment, the secondary display 110 is also housed within the display housing 802.

Therefore, the portable communication devices 300, 700 in accordance with the exemplary embodiments of the invention includes a visual display 102 that moves along the longitudinal axis 106 from a retracted position within the device housing 104 to an extended position outside of the device housing 104 to expose the viewing screen 116 of the visual display 102. When retracted, the visual display 102 is enclosed within the device housing 104 behind the front control face 304 of the portable communication device 300, 700. The user activates the release mechanism 312 or extension mechanism or otherwise causes the visual display 102 to move to the extended position when the relatively large visual display 102 is needed. Otherwise, the user uses the portable communication device 300, 700 while the visual display 102 is retracted. Accordingly, power consumption and device size are reduced during operations where a large color display is not needed. The secondary display 110 provides limited information to allow some visual information to be conveyed to the user without engaging the visual display 102.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A portable communication device comprising:
   a device housing; and
   an extendable visual display moveable relative to the device housing along a longitudinal axis of the visual display between a retracted position where the display is enclosed by the device housing and an extended position where the visual display is at least partially exposed outside the device housing.

2. A portable communication device in accordance with claim 1, wherein the visual display is in an off state when in the retracted position.

3. A portable communication device in accordance with claim 2, wherein the visual display is connected to a power supply only in the extended position.

4. A portable communication device in accordance with claim 1, the device housing comprising a front control face opposite a back, wherein the visual display is moveable along the longitudinal axis within an area between the front control face and the back.

5. A portable communication device in accordance with claim 4, wherein the front control face comprises a keypad.

6. A portable communication device in accordance with claim 1, further comprising an extension mechanism configured to extend the visual display from the retracted position to the extended position.

7. A portable communication device in accordance with claim 6, the extension mechanism comprising a compression spring configured to expand from at least a partially compressed state to at least a partially expanded state to move the visual display from the retracted position to the extended position.

8. A portable communication device in accordance with claim 7, the extension mechanism comprising a release mechanism configured to release the compression spring from the at least partially compressed state when activated.

9. A portable communication device in accordance with claim 1, further comprising device circuitry within the device housing connected to the visual display.

10. A portable communication device in accordance with claim 9, further comprising a connection interface providing an electrical connection between the device circuitry and the visual display.

11. A portable communication device in accordance with claim 10, wherein the connection interface comprises a plurality of display contacts that form electrical connections between the visual display and device contacts connected to the device circuitry when the visual display is in the extended position.

12. A portable communication device in accordance with claim 1, further comprising a secondary display configured to present information at least when the visual display is retracted.

13. A portable communication device in accordance with claim 12, wherein the secondary display is mounted to the visual display.

14. A portable communication device in accordance with claim 1, further comprising:
    a display housing, the visual display within the display housing; and
    device circuitry within the display housing connected to the visual display.

15. A portable communication device in accordance with claim 14, further comprising:
    a front control face connected to the device housing; and
    a front face interface configured to maintain an electrical connection between the device circuitry and the front control face at least when the display housing is extended and when the display housing is retracted within the device housing.

16. A portable communication device comprising:
    a device housing having a front control face and a back;
    an extendable visual display moveable relative to the device housing, between the front control face and the back, along a longitudinal axis of the visual display between a retracted position where the display is enclosed by the device housing and an extended position where the visual display is at least partially exposed outside the device housing; and
    a secondary display configured to present information at least when the visual display is retracted.

17. A portable communication device in accordance with claim 16, further comprising an extension mechanism configured to extend the visual display from the retracted position to the extended position.

18. A portable communication device in accordance with claim 17, the extension mechanism comprising a compression spring configured to expand from at least a partially compressed state to at least a partially expanded state to move the visual display from the retracted position to the extended position.

19. A portable communication device comprising:
    a device housing comprising a front control face and a back;
    an extendable visual display moveable relative to the device housing, between the front control face and the back, along a longitudinal axis of the visual display between a retracted position where the display is enclosed by the device housing and an extended position where the visual display is at least partially exposed outside the device housing;
    device circuitry within the device housing;
    a connection interface configured to provide an electrical connection between the device circuitry and the visual display at least when visual display is extended; and
    an extension mechanism configured to move the visual display from the retracted position to the extended position when a release mechanism is activated.

20. A portable communication device in accordance with claim 19, wherein the visual display is in an off state when in the retracted position.

* * * * *